United States Patent
Wakamatsu (10) Patent No.: US 10,594,939 B2
(45) Date of Patent: Mar. 17, 2020

(54) CONTROL DEVICE, APPARATUS, AND CONTROL METHOD FOR TRACKING CORRECTION BASED ON MULTIPLE CALCULATED CONTROL GAINS

(71) Applicant: CANON KABUSHIKI KAISHA, Tokyo (JP)

(72) Inventor: Nobushige Wakamatsu, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 92 days.

(21) Appl. No.: 15/134,619

(22) Filed: Apr. 21, 2016

(65) Prior Publication Data

US 2016/0316123 A1 Oct. 27, 2016

(30) Foreign Application Priority Data

Apr. 22, 2015 (JP) ................. 2015-087390

(51) Int. Cl.
*H04N 5/232* (2006.01)
*G06T 7/246* (2017.01)

(52) U.S. Cl.
CPC ......... *H04N 5/23258* (2013.01); *G06T 7/246* (2017.01); *H04N 5/23219* (2013.01);
(Continued)

(58) Field of Classification Search
CPC .......... G06T 2207/10016; G06T 7/246; H04N 5/23219; H04N 5/23258; H04N 5/23264; H04N 5/23287; H04N 5/23293
See application file for complete search history.

(56) References Cited

U.S. PATENT DOCUMENTS

| 7,773,121 B1* | 8/2010 | Huntsberger | .... G08B 13/19626 348/143 |
| 2005/0012833 A1* | 1/2005 | Yokota | ............... H04N 5/23212 348/240.99 |

(Continued)

FOREIGN PATENT DOCUMENTS

| CN | 1501694 A | 6/2004 |
| CN | 102763405 A | 10/2012 |

(Continued)

OTHER PUBLICATIONS

The above foreign patent documents were cited in a Dec. 21, 2018 Chinese Office Action, which is unclosed with an English Translation, that issued in Chinese Patent Application No. 201610246712. 0.

(Continued)

*Primary Examiner* — James T Boylan
(74) *Attorney, Agent, or Firm* — Cowan, Liebowitz & Latman, P.C.

(57) ABSTRACT

A control device configured to track a subject by controlling a correcting lens so that the subject is moved to a target position of a photographed image. The control device performs feedback control so that a difference between a position of the subject and a target position of the subject in the photographed image becomes small. The control device detects a photographing condition and changes a degree of tracking of the subject by changing a control gain in the feedback control based on the detected photographing condition.

9 Claims, 6 Drawing Sheets

(52) U.S. Cl.
CPC ..... *H04N 5/23264* (2013.01); *H04N 5/23287* (2013.01); *H04N 5/23293* (2013.01); *G06T 2207/10016* (2013.01)

(56) References Cited

U.S. PATENT DOCUMENTS

| | | | |
|---|---|---|---|
| 2005/0225678 A1* | 10/2005 | Zisserman | G06F 17/30256 348/571 |
| 2007/0171281 A1* | 7/2007 | Juza | G06K 9/00771 348/143 |
| 2009/0268064 A1* | 10/2009 | Mizuno | H04N 5/208 348/252 |
| 2010/0178045 A1* | 7/2010 | Hongu | G02B 7/102 396/80 |
| 2010/0185085 A1* | 7/2010 | Hamilton | A61B 8/06 600/437 |
| 2011/0105181 A1* | 5/2011 | McLeod | H04N 5/23248 455/556.1 |
| 2011/0298937 A1* | 12/2011 | Ogawa | H04N 5/23258 348/208.4 |
| 2012/0113280 A1* | 5/2012 | Stupak | G03B 5/00 348/208.99 |
| 2012/0268608 A1* | 10/2012 | Watanabe | H04N 5/232 348/169 |
| 2013/0004150 A1* | 1/2013 | Wakamatsu | G02B 27/646 396/55 |
| 2013/0004151 A1* | 1/2013 | Wakamatsu | G02B 27/646 396/55 |
| 2013/0093939 A1* | 4/2013 | Takanashi | G02B 7/36 348/345 |
| 2013/0120618 A1* | 5/2013 | Wang | H04N 5/23296 348/240.99 |
| 2015/0042828 A1* | 2/2015 | Wakamatsu | H04N 5/23254 348/208.4 |
| 2015/0097977 A1* | 4/2015 | Watanabe | H04N 5/23258 348/208.2 |
| 2016/0119560 A1* | 4/2016 | Hayashi | H04N 5/23212 348/241 |
| 2016/0173765 A1* | 6/2016 | Shimizu | H04N 5/2353 348/222.1 |

FOREIGN PATENT DOCUMENTS

| | | |
|---|---|---|
| JP | 54-042419 U | 3/1979 |
| JP | 07-226873 A | 8/1995 |
| JP | 08-116487 A | 5/1996 |
| JP | 2010-093362 A | 4/2010 |
| JP | 2010093362 A * | 4/2010 |

OTHER PUBLICATIONS

The above foreign patent documents were cited in a Dec. 25, 2018 Office Action, which is enclosed with an English Translation, that issued in Japanese Patent Application No. 2015087390.

* cited by examiner

CONTROL DEVICE, APPARATUS, AND CONTROL METHOD FOR TRACKING CORRECTION BASED ON MULTIPLE CALCULATED CONTROL GAINS

BACKGROUND OF THE INVENTION

Field of the Invention

The present invention relates to a control device, an optical apparatus, an imaging apparatus, and a control method.

Description of the Related Art

In imaging apparatuses such as digital cameras, important works for imaging, such as exposure decision or focus manipulations, are fully automated. In imaging apparatuses on which anti-vibration control devices preventing image blur caused due to camera shake or the like are mounted, factors causing mistakes in photographing by photographers are mostly resolved.

However, photographing in a state such that subjects are moving or photographing in telephoto states such that a focal distance becomes large causes following problems. When a subject is moving and deviates from a photographed image, it is necessary for photographers to perform special techniques in order to track the continuously moving subject by performing manipulations with high precision. When photographing is performed with cameras including telephoto lenses with greater focal distances, influences of image blur caused due to camera shake increase. Therefore, it is difficult to maintain main subject at the center of the photographed image. Even when the photographer manipulates imaging apparatuses to get the subject back inside the photographed image, the imaging apparatus performs blur correction on camera shake amounts due to intentional manipulations by the photographer. Therefore, it is difficult to minutely adjust the subject inside the photographed image or at the center of the photographed image due to the influence of anti-vibration control.

Japanese Patent Laid-Open No. 2010-93362 discloses an imaging apparatus that automatically tracks a subject by moving a part of an optical system in a direction intersecting an optical axis. Japanese Patent Laid-Open No. H7-226873 discloses an imaging apparatus that extracts a target subject from a photographing signal to output the position of the center of gravity of the subject and tracks a subject using a rotary camera platform or the like so that the position of the censer of gravity of the subject is output in the vicinity of the center of a photographed image.

When subject tracking is performed so that the central position of a subject is maintained at a specific position of a photographed image in the imaging apparatus disclosed in Japanese Patent Laid-Open No. H7-226873, delay or precision of subject detection may have an influence on tracking control. In addition to time wasted in the delay of detection of the subject, the imaging apparatus has to perform feedback control to maintain a subject in the vicinity of a specific position of a photographed image. When a feedback gain is increased to raise a subject tracking property, the imaging apparatus may perform oscillation depending on a photographing condition. When the feedback gain is decreased so that the oscillation is not performed, the subject tracking property is lowered and it is easy to miss a subject in a photographed image.

SUMMARY OF THE INVENTION

The present invention provides an apparatus that realizes excellent subject tracking according to a photographing condition.

According to an aspect of the present invention, a control device that tracks a subject using a movable unit moving the subject in a photographed image comprises: a control unit configured to control the movable unit so that the subject is moved to a target position of the photographed image; and a detecting unit configured to detect a photographing condition of the photographed image. The control unit changes a degree of tracking of the subject based on the detected photographing condition.

Further features of the present invent ion will become apparent from the following description of exemplary embodiments with reference to the attached drawings.

DESCRIPTION OF THE EMBODIMENTS (First Embodiment)

Figure 1:
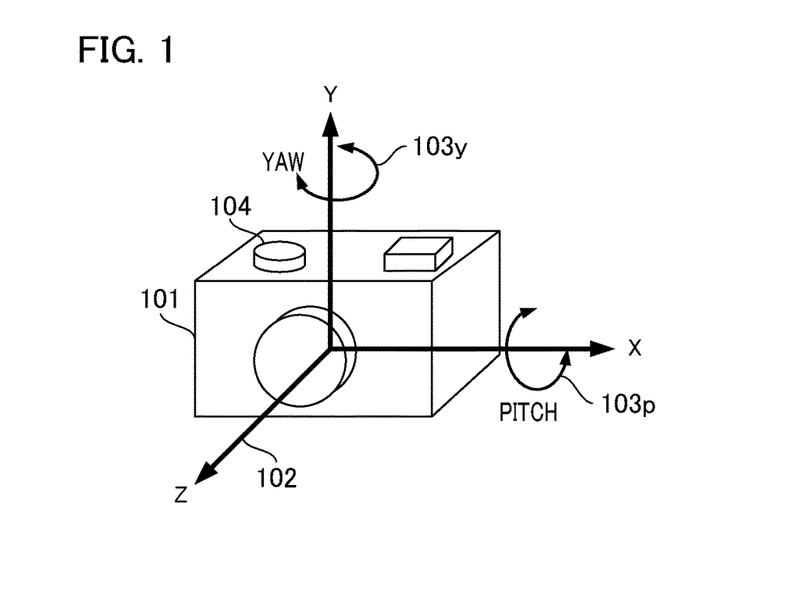
FIG. 1 is a diagram schematically illustrating an imaging apparatus according to an embodiment.
Figure 2:
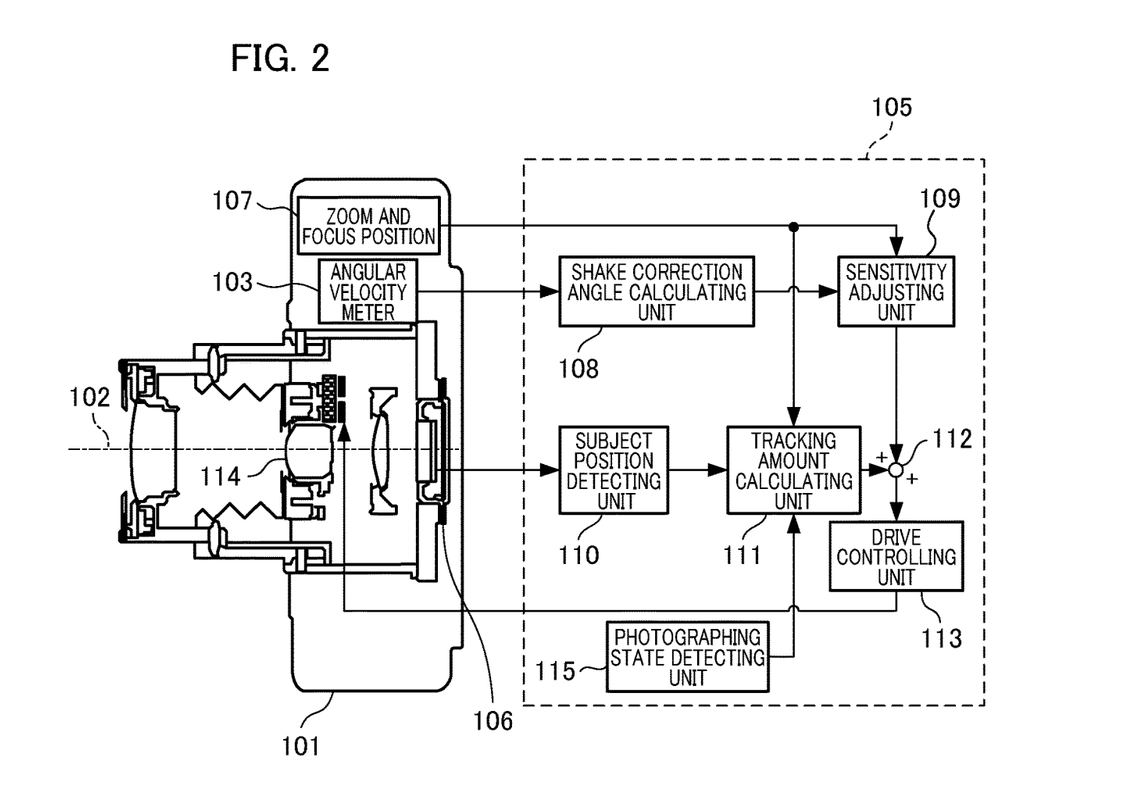
FIG. 2 is a diagram illustrating the configuration of the imaging apparatus.

FIG. 1 is a diagram schematically illustrating an imaging apparatus according to an embodiment. FIG. 2 is a diagram illustrating the configuration of the imaging apparatus.

A release button 104 is provided on the body of a camera 101. An opening or closing signal of a switch generated by a manipulation of the release button 104 is transmitted to a CPU 105. The CPU 105 functions as a control device according to the embodiment. The present invention can be applied to any optical device that has the function of the CPU 105. A correcting lens 114 and an image sensor 106 are located on an optical axis 102 of an imaging optical system. An angular velocity meter 103 is an angular velocity unit that detects an angular shake in a rotation indicated by an arrow 103$p$ (pitch) and an arrow 103$y$ (yaw). An output of the angular velocity meter 103 is input to the CPU 105. A shake correction angle calculating unit 108 calculates a shake correction angle based on the output of the angular velocity meter 103. Specifically, the shake correction angle calculating unit 108 cuts a DC component added as detection noise to the angular velocity meter 103 from the output of the angular velocity meter 103, subsequently performs an integration process, and outputs an angle signal. In the cutting of the DC component, for example, a high pass filter (HPF or a high pass transmission filter) is used. The output of the shake correction angle calculating unit 108 is input to a sensitivity adjusting unit 109.

The sensitivity adjusting unit 109 amplifies the output of the shake correction angle calculating unit. 108 based on zoom and focus position information 107 and a focal distance or a photographing magnification obtained from the zoom and focus position information 107 and sets the amplified output as a shake correction target value. The reason for obtaining the shake correction target value based on the zoom and focus position information 107 is that shake correction sensitivity on a camera image surface with respect to shake correction stroke of the correcting lens 114 is changed by a change in optical information such as focus or zoom of a lens. The sensitivity adjusting unit 109 outputs the shake correction target value as a shake correction amount to a drive controlling unit 113.

The correcting lens 114 functions as a movable unit that shifts and moves a subject in a photographed image. The drive controlling unit 113 performs subject tracking control by performing drive controlling on the correcting lens 114 so that the subject is moved to a target position of the photographed image. The drive controlling unit 113 performs correction control (optical anti-vibration) of image blur caused due to shake of the apparatus by driving the correcting lens 114 in a different direction from the optical axis. In the example illustrated in FIG. 2, the optical anti-vibration performed using the correcting lens 114 is adopted. However, as a method of correcting image blur, a method of correcting image blur by moving the image sensor within a plane perpendicular to the optical axis may be applied. Electronic anti-vibration in which an influence of the shake is reduced by changing a starting position of each photographing frame output by the image sensor may be applied. A plurality of image blur correcting methods may be combined.

Next, a method of controlling tracking of a subject using the correcting lens 114 will be described. A subject position detecting unit 110 illustrated in FIG. 2 detects the position of a subject (subject position) in a photographed image and outputs subject position information to a tracking amount calculating unit 111. A photographing state detecting unit 115 detects a photographing state (photographing condition) of the photographed image and outputs the photographing state to the tracking amount calculating unit 111. The tracking amount calculating unit 111 calculates a tracking correction amount which is a control amount used for the correcting lens 114 to track the subject based on the subject position information and the photographing condition. An adder 112 adds a shake correction amount output by the sensitivity adjusting unit 109 and the tracking correction amount output by the tracking amount calculating unit 111 and outputs an added amount to the drive controlling unit 113. The drive controlling unit 113 calculates a drive amount of the correcting lens 114 based on the output from the adder 112 and drives the correcting lens 114 based on the drive amount to track a subject and correct image blur.

Next, a method of detecting a subject position in the subject position detecting unit 110 will be described. The image sensor 106 obtains image information by converting light reflected from a subject into an electric signal. The image information is converted into a digital signal. The image information converted into the digital signal is transmitted to the subject position detecting unit 110.

Methods of automatically recognizing a main subject among subjects captured in a photographed image are as follows. A first method is a method of detecting a person. The subject position detecting unit 110 detects a face or a human body as a subject in the photographed image. In a face detecting process, a pattern determined as the face of a person is decided in advance, and thus a portion matching the pattern included in the image can be detected as the face of the person. The human body is also detected based on the degree of matching with the pre-decided pattern. The subject position detecting unit 110 calculates reliability indicating a probability that each of the detected subjects is a face. For example, the reliability is calculated from the degree of matching with the size of a face region or a face pattern in the image.

As another method of detecting the main subject, each region obtained by sectioning a distribution introduced from a histogram of hue, saturation, or the like in an image in which a subject captured in the photographed image is imaged and classifying the captured image for each section may be recognized as a subject. For example, a subject is recognized by sectioning a histogram of a plurality of color components generated in regard to a captured image in a mountain-type distribution range and classifying the captured images in the regions belonging to a combination of the same sections. By calculating an evaluation value for each of the recognized subjects, it is possible to determine a subject with the highest evaluation value as the main subject. After the main subject is decided, the region of the main subject can be tracked by detecting a region in which a feature amount is similar in sequentially subsequent captured images, for example, using the feature amount of the region of the main subject, such as a hue distribution or a size. The position information of the detected subject is input to the tracking amount calculating unit 111. The tracking amount calculating unit 111 calculates the tracking correction amount so that the position of the center of gravity of the subject is located near the image center.

Figure 3A:
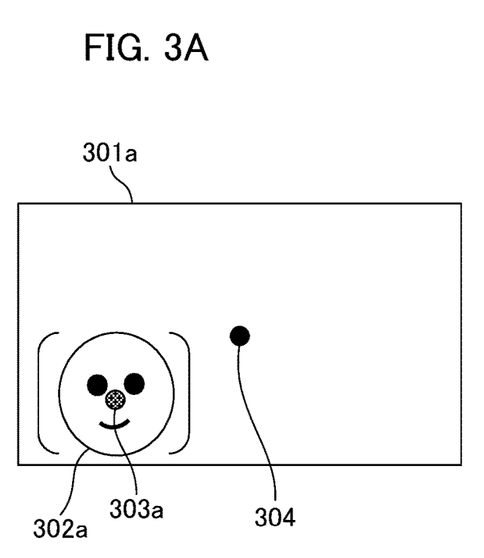
FIGS. 3A and 3B are diagrams for describing tracking control on a detected subject.
Figure 3B:
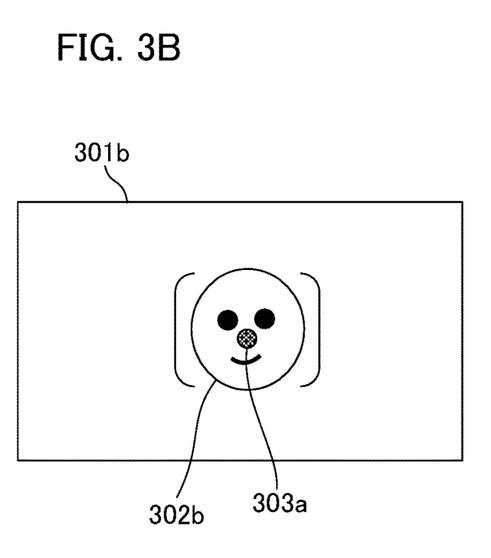

FIGS. 3A and 3B are diagrams for describing tracking control on a detected subject.

FIG. 3A illustrates a photographed image 301a before start of the subject tracking control. FIG. 3B illustrates a photographed image 301b after the start of the subject tracking control. In the photographed image 301a in FIG. 3A, a subject 302a is located at a position distant from an image center 304. Reference numeral 303a denotes the position of the center of gravity of a subject 302a (subject center-of-gravity position.). The CPU 105 performs tracking control so that a distance to the image center 304 of the subject center-of-gravity position 303a gradually becomes close by the tracking control, and the image center 304 finally substantially matches the subject center-of-gravity position. As illustrated in FIG. 3B, the subject center-of-gravity position 303a of the subject 302b in which the tracking is successful matches the image center 304.

Figure 4:
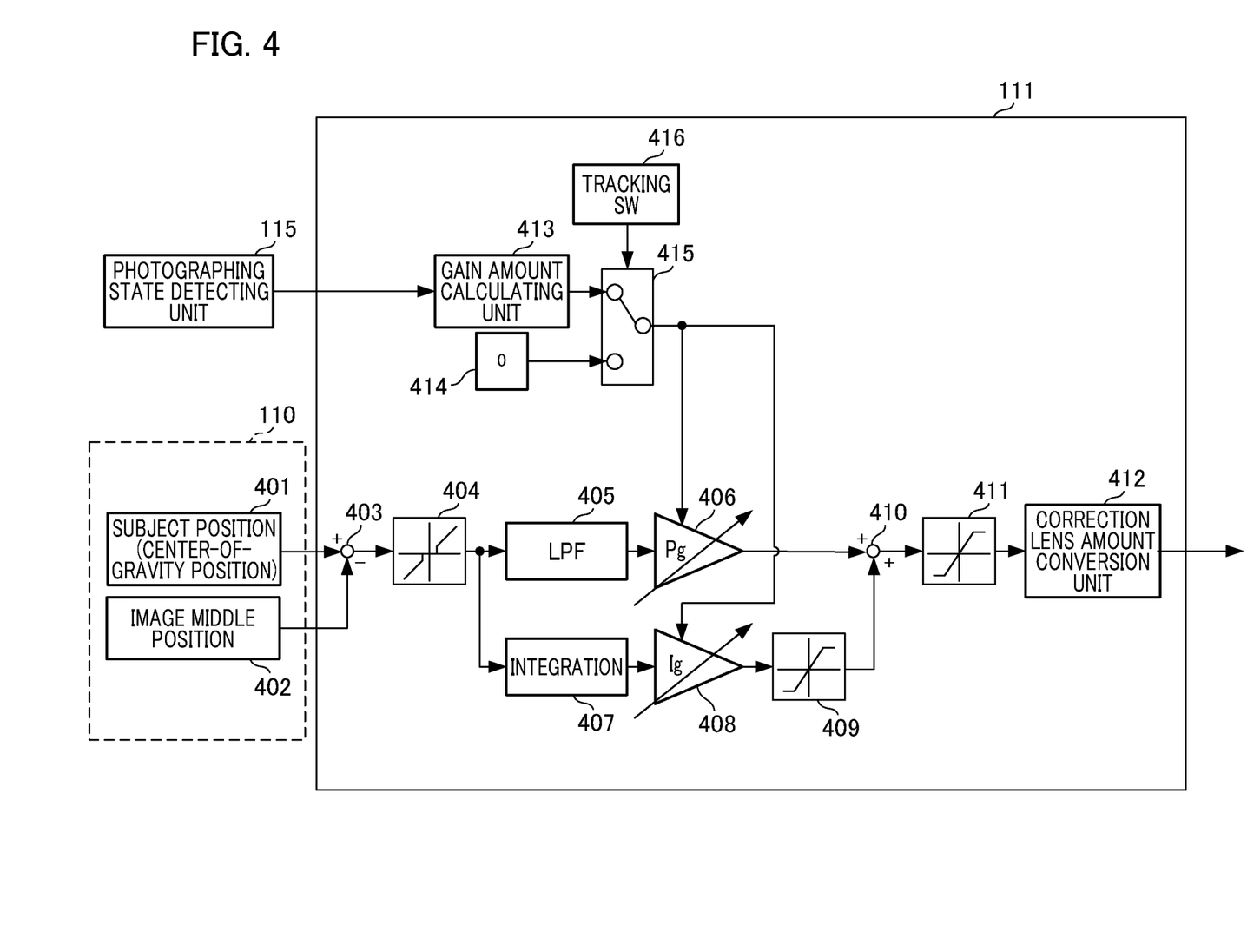
FIG. 4 is a functional block diagram illustrating a tracking amount calculation unit according to a first embodiment.

FIG. 4 is a functional block diagram illustrating the tracking amount calculating unit according to the first embodiment.

The tracking amount calculating unit 111 calculates an individual tracking correction amount at each axis in the vertical direction and the horizontal direction of the image. Here, only a single axis will be described. The tracking amount calculating unit 111 performs subject position feedback control, that is, feedback control such that a difference between the position of the subject and the image center (a target position of the subject) is small. Then, the tracking amount calculating unit 111 changes the degree of tracking by changing feedback gains (406 and 408) of the subject position feedback control based on the photographing condition.

A subtracter 403 subtracts the coordinates of an image middle position 402 from the coordinates of a subject position 401 based on subject position information detected by the subject position detecting unit 110. Accordingly, a distance (center deviation amount) between an image center position and the position of the center of gravity of a subject in an image is calculated. The calculated center deviation amount serves as data with a sign in which the image center is set to 0. An output of the subtracter 403 is input to a dead zone setting unit 404. When the output of the subtracter 403 is within 0±a predetermined range, the dead zone setting unit 404 outputs 0. When the output of the subtracter 403 is outside of 0±the predetermined range, the dead zone setting unit 404 outputs the output of the subtracter 403 without change.

The output of the dead zone setting unit 404 is input to a lowpass filter (LPF or a lowpass transmission filter) 405. The LPF 405 outputs a subject position signal from which high-frequency noise detected in the subject is cot to a proportional gain Pg 406. The proportional gain Pg 406 outputs a proportional control amount based on the subject position signal to an adder 410.

The output of the dead zone setting unit 404 is input to an integrator 407 and is subsequently input to an integration gain Ig 408. An upper-limit and lower-limit setting unit 409 performs setting so that an integration feedback control amount is neither equal to or greater than a predetermined upper limit nor equal to or less than a predetermined lower limit. The integration control amount which is an output of the upper-limit and lower-limit setting unit 409 is output to the adder 410. The adder 410 adds the proportional control amount and the integration control amount. The output of the adder 410 is input to an upper-limit and lower-limit setting unit 411 and is input to a correction lens amount conversion unit 412 after the upper-limit and lower-limit setting unit 411 performs setting so that the feedback control amount is neither equal to or greater than a predetermined upper limit nor equal to or less than a predetermined lower limit. The correction lens amount conversion unit 412 converts the input signal into a signal used for the correcting lens 114 to track the subject. In this way, a final tracking correction amount is calculated.

Through the above-described process, the subject tracking control can be automatically performed so that the center of gravity of the subject is located near the image center. In the first embodiment, the proportional gain Pg 406 and the integration gain Ig 408 are variable gains. Gain values are varied according to an output value of a signal selecting unit 415.

The photographing condition output by the photographing state detecting unit 115 is input: to a gain amount calculating unit 413. The gain amount calculating unit 413 sets control gains according to the photographing condition. A tracking switch (SW) 416, the gain amount calculating unit 413, and a fixed number 414 are input to the signal selecting unit 415. When the tracking switch. 416 is turned off, the signal selecting unit 415 selects an output of the fixed number 414 and gradually sets a gain to 0. Accordingly, the output of an adder 411 is set to 0 and a subject tracking operation is stopped. When the tracking switch 416 is turned on, the signal selecting unit 415 outputs the gain value calculated by the gain amount calculating unit 413.

Next, a method of calculating control gains (gain values) by the gain amount calculating unit 413 will be described.

The gain amount calculating unit 413 sets the proportional gain Pg and the integration gain Ig according to the photographing condition. By changing the control gains in accordance with the photographing condition, the degree of tracking of the subject is changed. Hereinafter, the reason for changing the control gains in accordance with the photographing condition and an effect will be described. In the subject detection, a delay time occurs. Delivery characteristics of downtime L occurring due to the delay time are as shown in Expression (1).

$$G(s)=e^{-Ls} \qquad \text{Expression (1)}$$

Figure 5A:
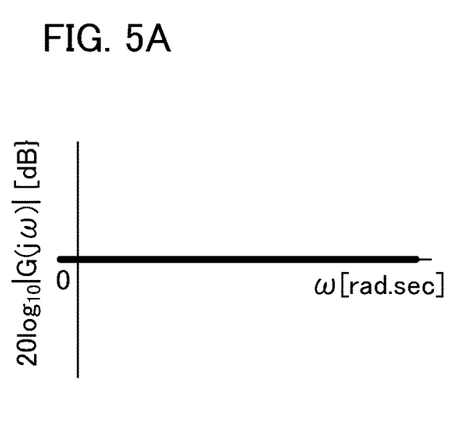
FIGS. 5A and 5B are diagrams illustrating board lines corresponding to delivery characteristics of downtime.
Figure 5B:
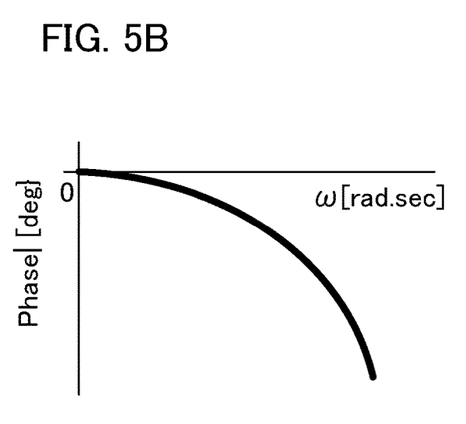

FIGS. 5A and 5B are diagrams illustrating board lines corresponding to delivery characteristics of downtime.

FIG. 5A illustrates gain characteristics. FIG. 5B illustrates phase characteristics. A phase shift occurs according to the downtime L.

The feedback control of the subject position described with reference to FIG. 4 has to be performed in consideration of the downtime. When the control gains (Pg 406 and Ig 408) are set to be considerably large in order to raise a tracking property, a characteristic in which oscillation is performed at a frequency equal to or greater than a certain frequency may be exhibited, and thus large image blur may occur. The feedback control of a subject position at which oscillation is not performed under any photographing condition may be performed in consideration of the downtime. However, since the tracking property of the subject tracking is lowered, it is easy to miss the subject in the photographed image.

Accordingly, the control device according to the first embodiment performs optimum subject tracking control according to the photographing condition by changing the gains set so that the tracking property is as fast as possible without oscillation according to the photographing condition.

For example, the tracking amount calculating unit 111 changes the gains under a photographing condition in which a subject speed on an image surface increases.

A movement amount ζ of a subject image on an imaging surface in movement of a subject is expressed in Expression (2) based on a movement amount z of an actual subject and a photographing magnification β.

$$\zeta=\beta z \qquad \text{Expression (2)}$$

An imaging surface blur amount δ which has an influence on camera blur is expressed in Expression (3) based on a photographing magnification β, a focal distance f, and camera blur amounts (an angle blur θ and a translation blur Y) obtained from a zoom position and a focus position of an imaging optical system.

$$\delta=(1+\beta)f\tan\theta+\beta Y \qquad \text{Expression (3)}$$

As understood from Expressions (2) and (3), the magnitudes of the imaging surface blur amount δ and the movement amount ζ of the subject image on the imaging surface are changed with a change in the photographing magnification. Accordingly, there are tendencies for a subject speed on the image surface to be faster when the photographing magnification is large, and for the subject speed on the image surface to be slower when the photographing magnification is small.

From Expression (3), the magnification of the imaging surface blur amount δ which has an influence on camera blur is changed by the focal distance f and the camera blur amount (an angle θ and translation movement x) in addition to the photographing magnification β. Image blur correction control may be performed. However, in practice, an imaging surface blur amount which has an influence on camera blur occurring due to camera shake may occur. At this time, image blur occurs to the extent of the remaining blur. Therefore, when a focal distance is large, the subject speed on the image surface is faster. When the focal distance is small, the subject speed on the image surface is slower.

Here, when the photographing magnification is large despite the fact that the control gains (the proportional gain Pg 406 and the integration gain Ig 408) are the same, the subject speed can easily become faster compared to the case in which the photographing magnification is small. When the subject speed is fast and the tracking property is considerably raised, there is a high possibility of control oscillation occurring. Accordingly, the CPU 105 sets the control gains to be smaller as the photographing magnification is larger and performs control such that the degree of tracking of the subject is small. In contrast, when the photographing magnification is small, the possibility of the control oscillation occurring is lower than when the photographing magnification is large. Therefore, the tracking property may be raised. Accordingly, when the photographing magnification is small, the control gains are set to be large.

The photographing magnification is a ratio of the size of a subject image (the size of an image on a photographing surface) photographed through a lens to the actual size of a subject. Under the condition in which a change in a focal distance is small when a zoom position is fixed, the photographing magnification becomes larger when a distance to a subject (subject distance) is closer, and the photographing magnification becomes smaller when the subject distance is more distant. Accordingly, the control gains may be changed according to the subject distance. Specifically, as the subject distance is smaller, the CPU 105 sets the control gains to be smaller and performs control such that the degree of tracking of the subject is small. When the subject distance is large, the control gains are set to be large.

When the focal distance is large, it is easy for the subject speed to become faster. When the focal distance is small, it is easy for the subject speed to become slower. Accordingly, when the focal distance is large, the CPU 105 sets the control gains to be small and performs control such that the degree of tracking of the subject is small. When the focal distance is small, the CPU 105 sets the control gains to be large.

At the time of electronic zoom, the image is expanded to be displayed. Therefore, it is easy for the subject speed to become faster than when the electronic zoom is not performed. Accordingly, at the time of the electronic zoom, the control gains are set to be small.

As described above, the control device can track the subject in addition to the tracking property of the subject and oscillation margin by changing the control gains of the subject feedback control according to the photographing condition in which the subject speed on the image surface is changed.

For example, the tracking amount calculating' unit 111 changes the control gains according to the photographing condition in which delay of the subject detection is changed. As the delay of the subject detection, there is delay associated with a frame and delay of calculation for detecting a subject from a photographing image. The subject detection is performed for each frame and is fed back to the subject tracking. However, a delay time is changed in accordance with a frame rate. When the frame rate is 30 pps (30 frames per second), delay of one frame is 1/30 of a second. When the frame rate is 60 pps (60 frames per second), delay of one frame is 1/60 of a second. Thus, the delay time of the subject detection is also changed.

When the downtime is short, phase delay decreases. Therefore, the oscillation margin increases and the control gains can be set to be raised. When the downtime is long, the phase delay increases. Therefore, the oscillation margin is lost and the control gains may not be raised. Accordingly, by changing the control gains of the subject feedback control according to the condition in which the delay of the subject detection is changed (the change in the frame rate), it is possible to track the subject in addition to the subject tracking property and the oscillation margin according to the photographing condition.

For example, the tracking amount calculating unit 111 changes the control gains according to the magnitude of reliability of the subject. This is because a mistake in the subject detection has an influence on the subject tracking control. A face recognition technology is generally known. However, depending on a photographing state, detection precision is low in some cases. For example, when the shape of a face part is changed with a change in an expression or a direction of a face or a luminance distribution of the face is changed with a change in a photographing environment, the degree of coincidence with a face is changed. Accordingly, depending on the photographing state, detection and non-detection of a face are repeated or a change in a position of the center of gravity of the face frequently occurs at a high frequency in some cases. Thus, when the detection precision of the subject is to and the control gains of the subject feedback control are increased, the subject position is considerably changed at a high frequency and oscillation occurs in some cases. Therefore, the control gains are preferably set to be small. When the detection precision is good, the subject position is not severely changed at a high frequency and oscillation rarely occurs. Therefore, the control gains are preferably set to be large in order to raise the tracking property.

Accordingly, the control device calculates reliability indicating a probability that the subject is a face as reliability of the subject detection and changes the control gains of the subject tracking control according to the magnitude of the reliability. By changing the control gains of the subject feedback control according to the reliability of the subject detection, it is possible to track the subject in addition to the subject tracking property and the oscillation margin.

For example, the tracking amount calculating unit 111 changes the gains according to whether the image blur caused due to the shake of the imaging apparatus is suppressed by a shake correction mechanism, that is, the state of image blur correction control.

When shake correction is in an OFF state, the image blur caused due to the camera shake is considerable particularly in the condition in which the focal distance is large, and the image of the subject is moved at a high frequency. When the control gains of the subject feedback control are set to be large in the case of the considerable image blur, the oscillation occurs due to a large vibration of the high frequency in some cases. Therefore, the control gains are preferably set to be small. However, when the shake correction is in an ON state and the image blur is suppressed by the shake correction control, a concern of subject vibration slightly oscillating is small. Therefore, the subject tracking property is preferably set to be large by setting the control gains of the subject feedback control to be large.

Accordingly, when the shake correction is in the ON state and the image blur is suppressed by the shake correction control, the control device sets control gains to be large. When the camera blur is not suppressed, the control device sets the control gains to be small. Accordingly, it is possible to track the subject in addition to the subject tracking property and the oscillation margin. Whether the image blur is suppressed can be determined by determining whether the shake amount of the device detected from an output of an angular velocity meter exceeds a correctable range (threshold value).

Figure 6:
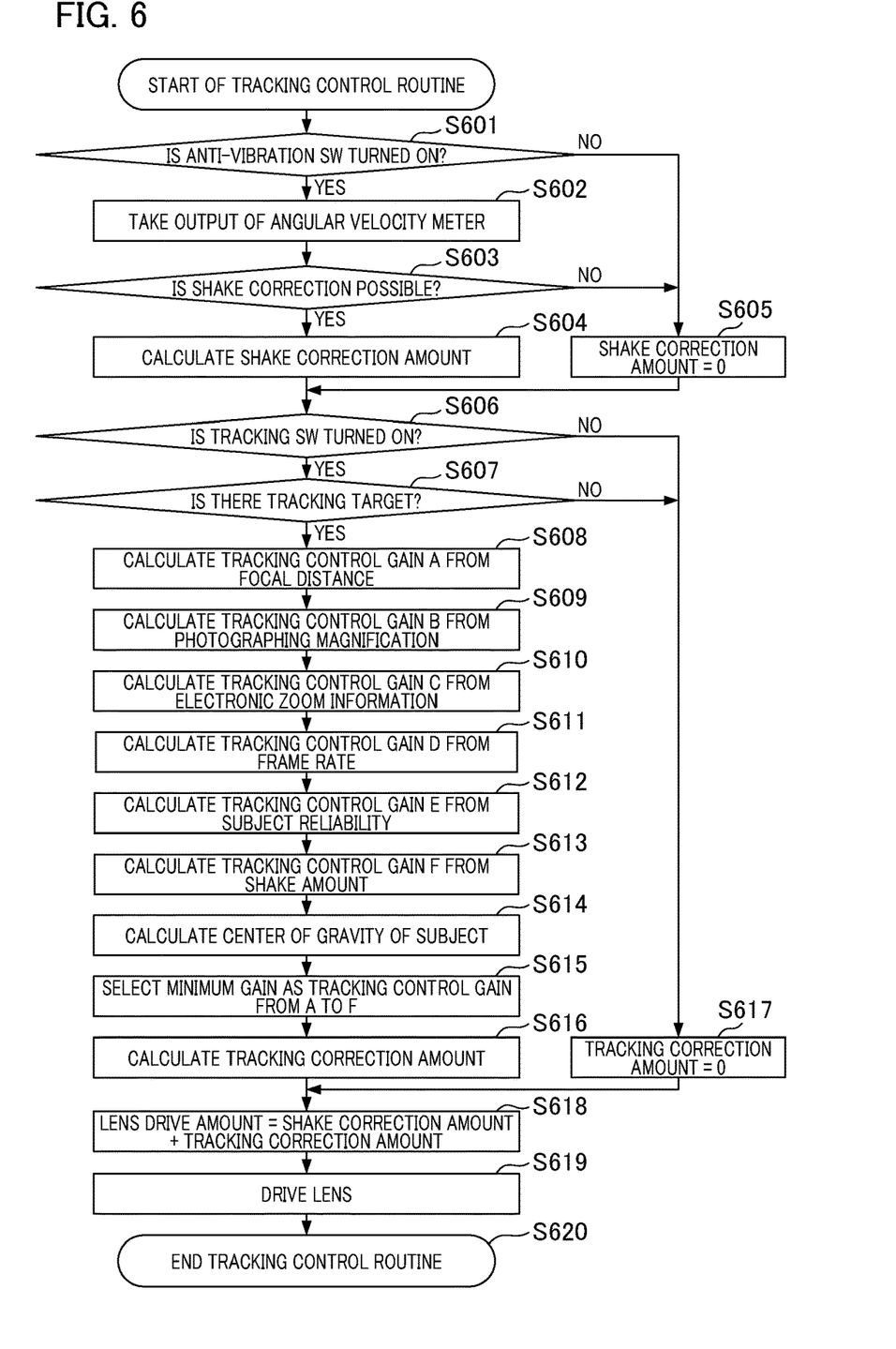
FIG. 6 is a flowchart for describing an example of subject tracking control.

FIG. 6 is a flowchart for describing an example of the subject tracking control.

The tracking control illustrated in FIG. 6 starts when a main power supply or the camera 101 is turned on and is performed at a given sampling period.

First, in step S601, the CPU 105 determines whether anti-vibration SW is turned on. When the anti-vibration SW is turned off, the process proceeds to S605 and the CPU 105 sets the shake correction amount to 0. Then, the process proceeds to step S606. When the anti-vibration SW is turned on, the process proceeds to S602.

In step S602, the CPU 105 takes an output of the angular velocity meter 103. In step S603, the CPU 105 determines whether the camera is in a state in which the shake correction is possible. Specifically, when the camera is in a state from supply of power to stabilization of the output of the angular velocity meter 103, the CPU 105 determines that the shake correction is not possible. When the camera is in a state after the stabilization of the output of the angular velocity meter 103, the CPU 105 determines that the shake correction is possible. Accordingly, it is possible for the shake correction not to be performed in a state in which an output value immediately after the supply of power is unstable. When the camera is not in the state in which the shake correction is possible, the process proceeds to step S605. When the camera is in the state in which the shake correction is possible, the process proceeds step S604.

In step S604, the CPU 105 causes the shake correction angle calculating unit 108 and the sensitivity adjusting unit 109 to calculate the shake correction amount based on the output of the angular velocity meter captured in step S602. Subsequently, in step S606, the CPU 105 determines whether the tracking SW is turned on. When the tracking SW is turned off, the process proceeds to step S617. Then, in step S617, the CPU 105 sets the tracking correction amount to 0 and the process proceeds to step S618. When the tracking SW is turned on, the process proceeds to step S607.

In step S607, the CPU 105 determines whether there is a tracking target subject from an image signal captured by the image sensor 106. When there is no tracking target subject, the process proceeds to step S617. When there is a tracking target subject, the process proceeds to step S608.

Subsequently, the CPU 105 calculates gains of the subject tracking control (tracking control gains) in processes of step S608 to S613 to be described below. The CPU 105 may calculate the tracking control gains by performing any one or a plurality of processes among steps S608 to S613.

in step S608, the CPU 105 calculates a tracking control gain A based on a focal distance decided from a focus position and zoom of a photographing optical system. For example, the tracking control gain A is set based on a pre-registered correspondence table of focal distances and the gains. In this correspondence table, as the focal distance is larger, the control gain is set to be smaller and the degree of tracking of the subject is set to be lower.

In step S609, the CPU 105 calculates a tracking control gain B based on the photographing magnification. For example, the tracking control gain B is set based on a pre-registered correspondence table of photographing magnifications and the gains. In this correspondence table, as the photographing magnification is larger, the gain is set to be smaller. The CPU 105 may detect subject distance information and set the tracking control gain B based on a subject distance. The CPU 105 sets the tracking control gain B to be smaller as the subject distance is smaller.

In step S610, the CPU 105 calculates a tracking control gain C based on an electronic zoom magnification indicated by electronic zoom information. For example, the tracking control gain C is set based on a pre-registered correspondence table of electronic zoom magnifications and the gains. In this correspondence table, as the electronic zoom magnification is larger, the control gain is set to be smaller and the degree of tracking of the subject is set to be lower.

In step S611, the CPU 105 calculates the tracking control gain P based on a frame rate. For example, the tracking control gain P is set based on a pre-registered correspondence table of frame rates and the gains. In this correspondence table, as the frame rate is lower, the control gain is set to be smaller and the degree of tracking of the subject is set to be lower. That is, as a frame interval (downtime) is larger, the control gain is smaller.

In step S612, the CPU 105 calculates a tracking control gain F based on the reliability of the subject which is a tracking target. For example, the tracking control gain F, is set based on a pre-registered correspondence table of reliabilities and the gains. In this correspondence table, as the reliability is lower, the control gain is set to be smaller and the degree of tracking of the subject is set to be lower.

In step S613, the CPU 105 calculates a tracking control gain F based on the shake amount of the imaging apparatus detected from the angular velocity meter 103. For example, the tracking control gain F is set based on a pre-registered correspondence table of shake amounts and the gains. In this correspondence table, when the shake amount exceeds a threshold value corresponding to an allowable limit of the image blur correction, the gain is set to be small.

Next, in step S614, the CPU 105 calculates the position of the center of gravity of the subject. Subsequently, in step S615, the smallest control gain, that is, the control gain with the largest oscillation margin, is selected from the calculated control gains (in this example, the control gains A to F) and is set as the tracking control gain (406 or 408).

Next, in step S616, the CPU 105 calculates the tracking correction amount based on the control gain set in step S615. Subsequently, in step S618, the CPU 105 adds the shake correction amount calculated in step S604 and the tracking correction amount calculated in step S616 to calculate a lens drive amount. The CPU 105 performs the image blur correction and the subject tracking by causing the drive controlling unit 113 to drive the correcting lens 114 based on the lens drive amount. Then, the process proceeds to step S620 to end the tracking control routine and the CPU 105 waits until a subsequent sampling period.

The control device according to the first embodiment calculates the control gains based on the photographing conditions and performs the automatic tracking control. Therefore, the optimum subject tracking can be performed in addition to the subject tracking property and the oscillation margin.

In the embodiment, so-called optical anti-vibration for movement within a plane perpendicular to the optical axis using the correcting lens as a shake correcting unit is applied. However, the present invention is not limited to the optical anti-vibration, but the following configurations can also be applied:

(1) the configuration of a subject tracking device that moves an image sensor within a plane perpendicular to an optical axis;

(2) the configuration of a subject tracking device that changes a start position of each photographing frame output by an image sensor;

(3) the configuration of a subject tracking device that rotatably drives a barrel including an image sensor and a photographing lens group;

(4) the configuration of a subject tracking device combined with a rotary camera platform that is provided separately from the imaging apparatus and can pan and tilt an imaging apparatus; and (5) combinations of the configurations of the plurality of above subject tracking devices.

(Second Embodiment)

Figure 7:
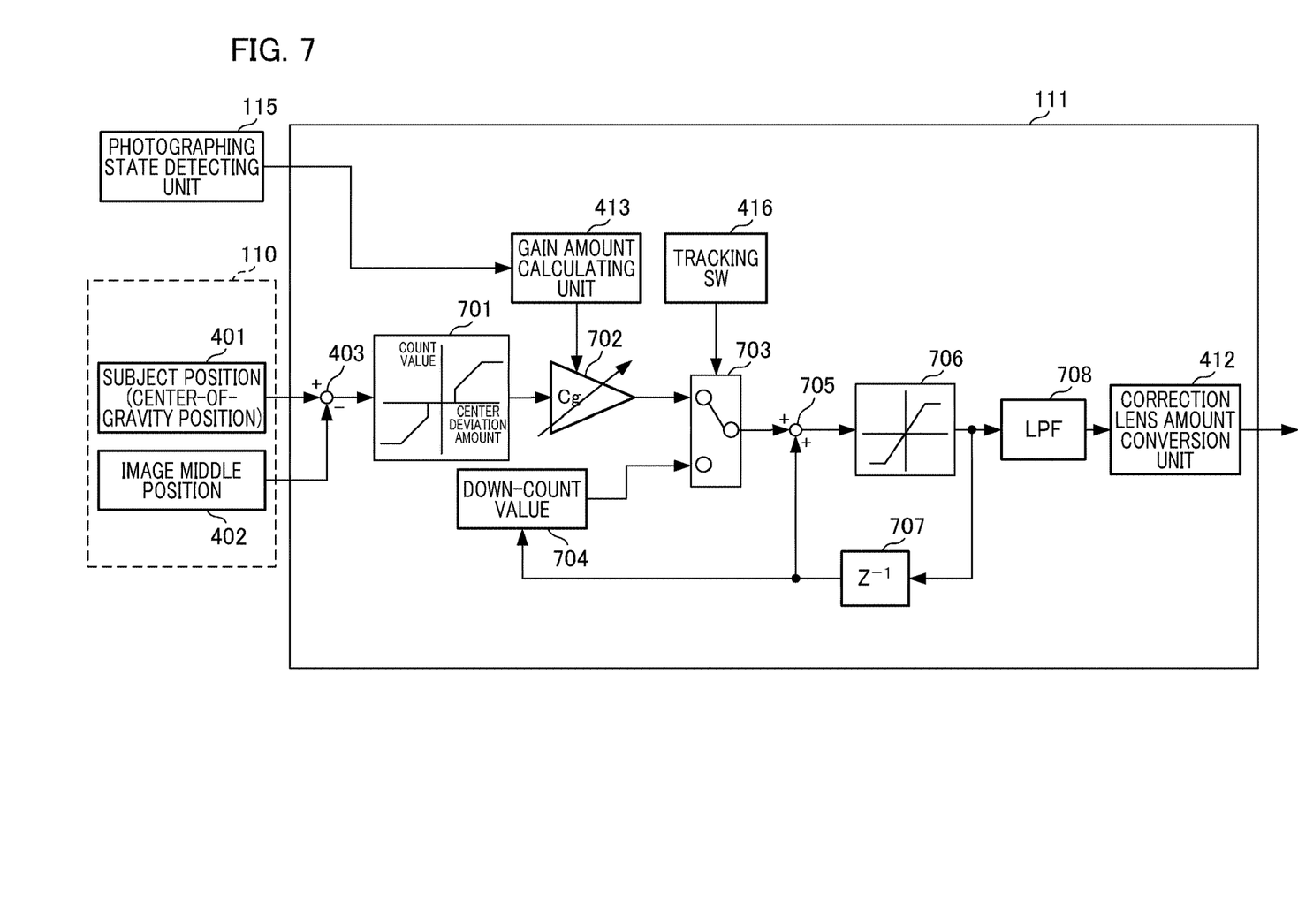
FIG. 7 is a functional block diagram illustrating a tracking amount calculating unit according to a second embodiment.

FIG. 7 is a functional block diagram illustrating a tracking amount calculating unit according to a second embodiment.

The tracking amount calculating unit 111 calculates an individual tracking correction amount at each axis in the vertical direction and the horizontal direction of the image. Here, only a single axis will be described. The tracking amount calculating unit 111 calculates a count value for tracking a subject based on a difference between the position of the subject and an image center (a target position of the subject). The tracking amount calculating unit 111 adds the count value for each sampling period to perform control such that the position of the subject is moved to the target position. Then, The tracking amount calculating unit 111 changes the degree of tracking by changing the magnitude of the count value based on a photographing condition.

The subtracter 403 subtracts the coordinates of a subject position 401 and the coordinates of an image middle position 402 based on subject position information detected by the subject position detecting unit 110. Accordingly, a distance (center deviation amount) between an image center position and the position of the center of gravity of a subject in an image is calculated. The calculated center deviation amount serves as data with a sign in which the image center is set to 0. An output of the subtracter 403 is input to a count value table 701. Based on the magnitude of a distance of a difference between the position of the center of gravity of the subject and the image center, a count value for the tracking is calculated.

The tracking amount calculating unit 111 sets the count value to 0 when the center deviation amount is equal to or less than a predetermined threshold value or equal to or greater than a predetermined threshold value $-Z$. Accordingly, a dead zone region in which no tracking is performed within a predetermined range of $\pm Z$ from a center is provided. The count value table 701 is a table in which the count value increases when the center deviation amount increases. The sign of the count value is calculated in accordance with the sign of the center deviation amount.

An output of the count value table 701 is input to a variable gain 702. The gain amount calculating unit 413 calculates the gain of the count value based on the photographing condition detected by the photographing state detecting unit 115. As in the first embodiment, the gain is set according to a focal distance, a photographing magnification, a subject distance, an electronic zoom magnification, a frame rate, subject reliability, a shake amount, or the like. The gain amount calculating unit 413 sets the calculated gain as a variable gain Cg.

An output of the variable gain 702 is input to a signal selecting unit 703. An output of a down-count value setting unit 704 and a tracking switch 416 are also input to the signal selecting unit 703. When the tracking switch is turned on, the signal selecting unit 703 selects the output of the variable gain 702. When the tracking switch is turned off, the signal selecting unit 703 selects the output of the down-count value setting unit 704. The selected output is input to an adder 705.

The down-count value setting unit 704 sets the down-count value. A negative down-count value is added to a tracking amount previous-sampling value 707 so that the absolute value of the tracking correction amount decreases. The tracking amount previous-sampling value 707 is a tracking correction amount up to the previous sampling. The tracking amount previous-sampling value 707 is input to the down-count value setting unit 704. When the tracking amount previous-sampling value 707 has a positive sign, the down-count value setting unit 704 sets the down-count value to be negative. When the tracking amount previous-sampling value 707 has a negative sign, the down-count value setting unit 704 sets the down-count value to be positive. Accordingly, the absolute value of the tracking correction amount is decreased. When the tracking amount previous-sampling value 707 is within $0\pm a$ predetermined range, the down-count value setting unit 704 sets the down-count value to 0.

The adder 705 adds the output of the signal selecting unit 703 and the tracking amount previous-sampling value 707. An output of the adder 705 is input to an upper and lower limit setting unit 706 and is set so that the tracking correction amount is neither equal to or greater than a predetermined upper limit nor equal to or less than a predetermined lower limit. An output of the upper and lower limit setting unit 706 is input to an LPF 708, and a tracking correction amount obtained by cutting high-frequency noise of subject detection is input to the correction lens amount conversion unit 412. The correction lens amount conversion unit 412 converts the input tracking correction amount into a signal for tracking by the correcting lens 114 to calculate a final tracking correction amount.

Through the above-described processes, the tracking control is performed such that the subject position is gradually located closer to the image center by calculating the count value for each control sampling to be added to the tracking correction amount according to the difference between the image center position and the subject position. The control device according to the second embodiment can perform the optimum subject tracking in addition to the subject tracking property and the oscillation margin by performing the automatic tracking control based on the count value calculated in accordance with the photographing condition.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s) The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087390, filed Apr. 22, 2015, which is hereby incorporated by reference wherein in its entirety.

What is claimed is:

1. A control device that corrects a shake of imaging apparatus and that tracks a subject using a correcting lens moving the subject in a photographed image, the device comprising:
    at least one processor or circuit configured to perform the operations of the following units:
    a first calculating unit configured to calculate a shake correction amount for correcting the shake of the imaging apparatus on the basis of an output of an angular velocity meter;
    a second calculating unit configured to calculate a tracking correction amount as a control amount for tracking the subject on the basis of an output of an image sensor; and
    a control unit configured to control the correcting lens on the basis of a lens drive amount obtained by adding the shake correction amount and the tracking correction amount, so that a difference between a position of the subject and a center of the photographed image becomes smaller,
    wherein the control unit changes a control gain of the tracking correction amount based on a detected photographing condition to change a degree of tracking of the subject,
    wherein the control unit calculates a plurality of control gains by different processing,
    wherein the control unit selects the control gain having a minimum tracking correction amount from the plurality of calculated control gains when shake correction is turned ON and tracking correction is turned ON.

2. The control device according to claim 1,
    wherein the control unit calculates a control gain among the plurality of control gains so that the degree of tracking of the subject becomes smaller in the case in which a focal distance of a photographing optical system is larger than a predetermined value in comparison to the case in which the focal distance is smaller than the predetermined value.

3. The control device according to claim 1,
    wherein the control unit calculates a control gain among the plurality of control gains so that the degree of tracking of the subject becomes smaller in the case in which a photographing magnification of a photographing optical system is larger than a predetermined value in comparison to the case in which the photographing magnification is smaller than the predetermined value.

4. The control device according to claim 1,
    wherein the control unit calculates a control gain among the plurality of control gains so that the degree of tracking of the subject becomes smaller in the case in which an electronic zoom magnification is larger than a predetermined value in comparison to the case in which the electronic zoom magnification is smaller than the predetermined value.

5. The control device according to claim 1,
    wherein the control unit calculates a control gain among the plurality of control gains so that the degree of tracking of the subject becomes smaller in the case in which a frame rate of the plurality of photographed images is smaller than a predetermined value in comparison to the case in which the frame rate of the plurality of photographed images is larger than the predetermined value.

6. The control device according to claim 1,
    wherein the control unit calculates a control gain among the plurality of control gains so that the degree of tracking of the subject becomes smaller in the case in which reliability of the detected subject is lower than a predetermined value in comparison to the case in which the reliability of the detected subject is higher than the predetermined value.

7. The control device according to claim 1,
    wherein the control unit calculates a control gain among the plurality of control gains so that the degree of tracking of the subject to be smaller in the case in which a shake amount of the control device exceeds a threshold value in comparison to the case in which a shake amount of the control device does not exceed the threshold value.

8. The control device according to claim 1,
    wherein the control unit calculates a count value to track the subject based on a difference between a position of the subject and a target position of the subject in the photographed image and performs control so that the subject is moved to the target position by adding the count value to a control amount used to track the subject for each sampling time,
    wherein the control unit changes a control gain of the count value based on the detected photographing condition to change a degree of tracking of the subject.

9. A method of controlling and correcting a shake of an imaging apparatus and tracking a subject using a correcting lens moving the subject in a photographed image, the method comprising;
    calculating a shake correction amount for correcting the shake of the imaging in apparatus on the basis of an output of an angular velocity meter;
    calculating a tracking correction amount as a control amount for tracking the subject on the basis of an output of an image sensor; and
    controlling the correcting lens on the basis of a lens drive amount obtained by adding the shake correction amount and the tracking correction amount, so that a difference between a position of the subject and a center of the photographed image becomes smaller,
    wherein controlling step changes a control gain of the tracking correction amount based on a detected photographing condition to change a degree of tracking of the subject,
    wherein the controlling step also calculates a plurality of control gains by different processing,
    wherein the controlling step also selects the control gain having a minimum tracking correction amount from the plurality of calculated control gains when shake correction is turned ON and tracking correction is turned ON.

* * * * *